Jan. 23, 1962   J. M. LEACH   3,018,182
PROCESS AND APPARATUS FOR TREATING MATERIALS
Filed July 25, 1960
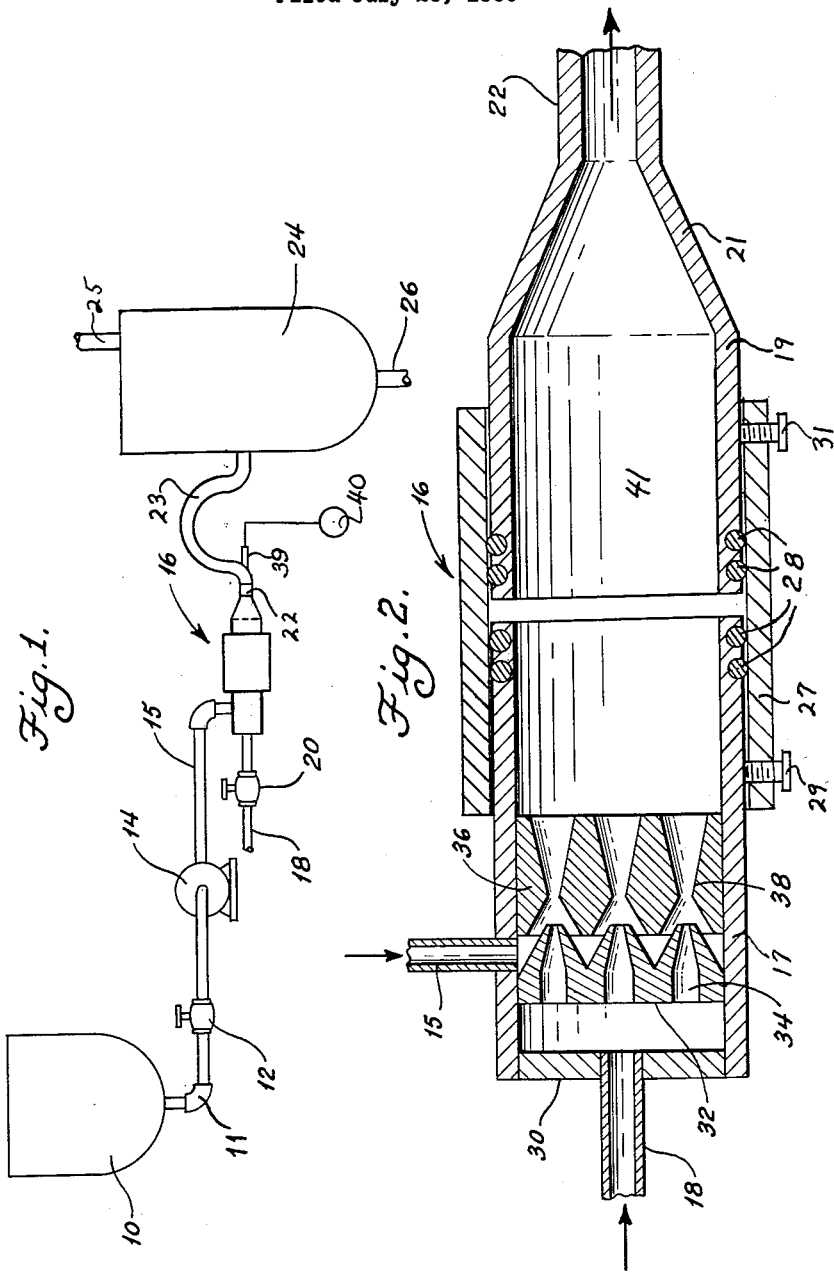
INVENTOR.
John M. Leach United States Patent Office 3,018,182
Patented Jan. 23, 1962

3,018,182
PROCESS AND APPARATUS FOR TREATING MATERIALS
John M. Leach, 17 Monfort Road, Port Washington, N.Y.
Filed July 25, 1960, Ser. No. 44,934
20 Claims. (Cl. 99—134)

This invention relates to a process and apparatus for treating materials; more particularly to the type of treating process where one substance is injected into and mixed with a second substance. The process of the present invention has been shown for the purpose of explanation as a cooking process, and, more particularly, a process for cooking materials containing starch. It is capable of use in many other treating applications.

It is an object of this invention to provide a continuous process for and apparatus for cooking starch-containing materials which may be either confections, paper sizes, textile slashings, bonding materials, puddings, mayonnaise, pie fillings, adhesives, thickeners, various types of coatings, and other materials which are produced by the cooking of starch-containing materials.

Another object of this invention is to provide a continuous cooking process and apparatus which does not employ large amounts of water which have to be subsequently removed by boiling, evaporation or absorption.

A further object of this invention is to provide a cooking process and apparatus which is simple in nature; can be used by ordinary workmen, and can be quickly and accurately controlled as to all variables, such as, temperature, pressure, flow volume and cooking time of the material undergoing treatment.

It is a still further object of the present invention to provide a cooking process and apparatus in which gaseous materials entrained within the material being processed can be removed rapidly and effectively.

Other objects and advantages of the present invention will be obvious to those skilled in the art from a consideration of the following descriptions of what are now considered to be the preferred forms of the present invention.

In the accompanying drawings;

FIG. 1 is a diagrammatic view of a preferred form of apparatus for performing the process of the present invention and;

FIG. 2 is a cross sectional view of a cooker unit of the apparatus of the present invention.

Referring to the drawings, 10 is a mixing kettle in which ingredients to be processed in accordance with the present invention are suitably mixed. The mixing is usually accomplished by agitation by any suitable form of mixer (not shown) and by the application of sufficient heat to facilitate mixing which can be supplied in any well known manner.

A pipe line 11 extends from the mixing kettle 10 to a pump 14. This pump may be any of the well known types of pumps presently available on the market which is driven by any suitable variable speed prime mover. A suitable cut-off valve 12 is installed in the line 11. From the pump 14, a pipe line 15 extends to the cooker unit 16.

Steam from any desired source is conveyed by pipe line 18 which is preferably provided with a flow control valve 20 to the cooker unit 16. Material is exhausted from the cooker unit 16 by means of a pipe 22 which has a flexible section 23 formed of any desired well known flexible type of material capable of wtihstanding temperatures up to, for example, 500 degrees F. This flexible section 23 feeds the material into a tank 24 which is selected in size so that it is never completely filled by the amount of liquid flowing from the flexible section 23. A pipe 25 leads to any suitable exhaust pump of any well known type (not shown) which places a vacuum on and above the material so as to extract all steam, air or any other gaseous material which may be entrapped in the cooked material. The cooked material is led from the tank 24 by a suitable exhaust pipe 26 which can feed either by gravity or by means of any well known type of pump to a holding tank or a using point, as desired.

The cooker unit 16 consists of a cylindrical section 17 and a cylindrical section 19. The section 19 is provided with a reducing section 21 which leads to the exhaust pipe 22.

A cylindrical section 27 extends partly over the section 17 and partly over the section 19 and is held in adjusted position by any suitable means such as set screws 29 and 31. Leakage between the sections 17, 19 and 27 is prevented by suitable packing which may be in the form of O-rings 28 formed of any desired flexible heat resisting material readily available on the market such as "neoprene" or "Teflon."

An end section 30 is fitted in the cylindrical section 17 and steam supply pipe 18 which terminates in the section 30 supplies steam to the interior of section 17.

A header 32 is fitted within section 17 and is provided with ports 34 which preferably terminate in nozzle like projections. A second header 36 is also fitted within the cylindrical section 17 and is provided with openings 38 which are preferably enlarged at the entrance end, diminish in diameter and then flare outwardly as shown. Each pair of openings 34 and 38 are arranged so as to be in axial alignment as shown, and there are preferably at least 5 of each of the openings 34 and 48.

The pipe 15 which leads from the pump 14 terminates in the side wall of the cylindrical section 17 so as to direct the material to be cooked into the space between the outlet end of each opening 34 and the beginning of each opening 38.

A temperature responsive element 39 is placed preferably in the exhaust line 22—23 at the position shown and operates a temperature indicating and regulating instrument 40 of any of the well known types on the market which also preferably suitably controls the volume of steam passing through pipe 18 in well known manner to accurately regulate and hold constant the temperature of the material being cooked or otherwise processed in the cooker unit 16.

By way of explanation and not in limitation of the invention, the process of the present invention will be described in connection with the cooking of a gum base confection. Such confection usually consists of a suitably selected mixture of cane sugar, corn syrup, water and starch. Other ingredients such as dextrose hydrate, gum such as gum acacia, and other well known substances are frequently also included when desired. The ingredients are poured into kettle 10 and mixed by agitation and suitably heated in any desired manner such as by a steam jacket (not shown) to any desired temperature, which usually ranges between 155 and 190 degrees F.

When the cooking operation is to be started, the valve 12 is opened to the extent desired and the pump 14 is started which forces the mixed gum confection slurry at any selected flow rate (which may be adjusted by the variable speed drive) into the inside of the cooker section 17 in the space between the headers 32 and 36. The steam valve 20 is opened and live steam enters the cooker section 17 and flows rapidly through the nozzles 34 and into and through the openings 38.

The pressure imparted to the slurry by the pump 14 and the high velocity of the steam forces all of the slurry and steam through the constricted passage 38 and the constrictions compress the steam into intercontact with the slurry which causes all portions of the slurry and all particles of the starch to be almost instantaneously, uniformly and forcibly contacted by the steam and the starch and steam to be held in close contact throughout travel through the passages 38. The constrictions of these passages 38 as shown not only insures complete and uniform mixing between the steam and the starch molecules but also prevents sticking of the starch to the inside of the passage because the flared shape of the terminal areas of these passages compensate for expansion of the starch molecules as gelatinization occurs and prevents this expansion from clogging the passages.

The thorough mixture of steam and slurry passes from the passages 38 into the chamber 41 beyond formed by the sections 17, 19 and 27. The intermixing emissions of the steam-slurry mixture from several passages 38 at the same time sets up extreme turbulene in the mixture in the chamber 41 which further insures uniform contact between the steam and starch molecules which produces unparalleled cooking consistency in the final product.

The steam-slurry mixture leaves the chamber 41 through the pipe 22—23 and enters the cooling tank 24 where the steam flashes out of the slurry along with any entrapped air or other gas and passes through the pipe 35 to a suitable exhaust pump and exhaust to the atmosphere or other disposal facility.

This sudden removal of the steam causes cooking of the slurry to discontinue abruptly as it moves into the tank 24 so that the length of time the slurry is subjected to the selected cooking temperature is very accurately controlled. If the tank 24 were to be omitted and the slurry were merely passed directly to a holding tank or other receiver by the pipe 22, the length of the cooking time and degree of cooking would vary with every installation because cooking would continue all the way along the pipe 22 until either the steam was released or was condensed and absorbed by the slurry which would unduly dilute the slurry and necessitate lengthy and costly drying operations later and also adversely affect the character and consistency of the final product. The only other way to avoid this condition would be to make pipe 22 very short and the same length for every installation which would be awkward and a detrimental factor in the application of the cooker to various operations.

It is to be understood that the speed of cooking will be controlled by setting regulator 40 so that a constant and definite temperature will be maintained on the material by the steam from pipe 18 which will usually vary from 60 to 100 pounds pressure. For gum base confections the temperature is usually between 240 and 300 degrees F. It will vary for other slurry mixtures depending on the consistency required in the final product and the final use which is to be made of it.

It is also desirable at times to vary in a controlled manner the length of time the slurry is cooked. In the apparatus of the present invention the cooking time can be readily extended by loosening the screws 29 and 31, moving the cylindrical section 19 to the right as shown in FIG. 2 to any extent desired within the length limit of the cylindrical section 27, and again tightening the thumb screws. During this movement the flexible section 23 takes a shape which will permit of the movement of the section 19. The cooking time can of course be decreased by reversing this adjustment.

It will be seen that the space between the entrance of the openings 38 and the entrance of the tank 24 provides a new definite but adjustable size cooking zone.

This novel feature of varying the capacity of the cooking chamber and thereby varying the length of time the material undergoes cooking by the steam, effects an unusually accurate control of the cooking action and in turn provides absolute control of the nature of the final product obtained.

This unique combination of control of length of time the material is heated and compression forced intercontact between the steam and material makes it possible to produce final products of exceptional quality and uniformity. It also makes it possible to vary one product relative to another at will without necessitating any change in the equipment other than a very slight adjustment.

It is to be understood that the forms of this invention described above for the purpose of explanation are not to be considered limitative since many modifications may be made in the form of application of this invention without departing from its scope.

The invention having been described, what is claimed is:

1. A process of treating material which expands during treatment comprising projecting a stream of treating fluid, projecting the material to be treated into the stream of treating fluid, compresing the treating fluid and material together into close intercontacting relationship to bring about expansion of the material, and releasing the compression gradually to compensate for the expansion but maintaining the treating fluid and material in close intermixed relationship.

2. A process of treating material which expands during treatment comprising projecting a stream of treating fluid, projecting the material to be treated into the stream of treating fluid, compressing the treating fluid and material together into close intercontacting relationship to bring about expansion of the material, and releasing the intermixture into a chamber where severe agitation and further expansion of the material takes place still under pressure.

3. A process of treating material which expands during treatment comprising projecting a stream of treating fluid, projecting the material to be treated into the stream of treating fluid, compressing the treating fluid and material together into close intercontacting relationship to bring about expansion of the material, and suddenly exposing the intermixture to a reduced pressure area to abruptly extract the treating fluid and discontinue the treating operation.

4. A process of treating material which expands during treatment comprising projecting several streams of treating fluid, projecting material to be treated into each stream of treating fluid, compressing each stream of treating fluid and material together into close intercontacting relationship to bring about expansion of the material, releasing the pressure gradually to compensate for the expansion but maintaining the treating fluid and material in close intermixed relationship, and releasing the streams of intermixture into a chamber so that the streams mutually interfere and produce severe agitation.

5. A process of treating material which expands during treatment comprising projecting several streams of treating fluid, projecting material to be treated into each stream of treating fluid, compressing each stream of treating fluid and material together into close intercontacting relationship to bring about expansion of the material, releasing the pressure gradually to compensate for the expansion but maintaining the treating fluid and material in close intermixed relationship, and suddenly exposing the intermixture to a reduced pressure area to abruptly extract the treating fluid and discontinue the treating operation.

6. A process of cooking material which expands during cooking comprising projecting a stream of steam, projecting the material to be cooked into the stream of steam, compressing the steam and material together into close intercontacting relationship to bring about expansion of the material, and releasing the compression gradually to compensate for the expansion but maintaining the steam and material in close intermixed relationship.

7. A process of cooking material which expands during cooking comprising projecting several streams of steam, projecting material to be cooked into each stream of steam, compressing each stream of steam and material together into close intercontacting relationship to bring about expansion of the material releasing the pressure gradually to compensate for the expansion but maintaining the material in close intermixed relationship, and releasing the streams of intermixture into a chamber so that the streams mutually interfere and produce severe agitation.

8. A process of cooking material which expands during cooking comprising projecting several streams of steam, projecting material to be cooked into each stream of steam, compressing each stream of steam and material together into close intercontacting relationship to bring about expansion of the material, releasing the pressure gradually to compensate for the expansion but maintaining the steam and material in close intermixed relationship, and suddenly exposing the intermixture to a reduced pressure area to abruptly extract the steam and discontinue the cooking operation.

9. A process of cooking starch-containing material which expands during cooking comprising projecting several streams of steam, projecting starch-containing material to be cooked into each stream of steam, compressing each stream of steam and starch-containing material together into colse intercontacting relationship to bring about expansion of the material, releasing the pressure gradually to compensate for the expansion but maintaining the steam and starch-containing material in close intermixed relationship, and suddenly exposing the intermixture to a reduced pressure area to abruptly extract the steam and discontinue the cooking operation.

10. A process of treating material containing starch, sugar and water which expands during treatment comprising projecting a stream of treating fluid, projecting the material to be treated into the stream of treating fluid, compressing the treating fluid and material together into close intercontacting relationship to bring about expansion of the material, and releasing the compression gradually to compensate for the expansion but maintaining the treating fluid and material in close intermixed relationship.

11. A cooking apparatus comprising a cooking chamber, means for introducing material to be cooked into the chamber, means for applying heat to the chamber, and means for varying the capacity of the cooking chamber to vary the cooking time.

12. A cooking apparatus comprising a cooking chamber, means for introducing material to be cooked into the chamber, means for directing steam into the material to be cooked, means for compressing the steam and material into a close intermixed relationship, means for permitting controlled expansion of the intermixture, and a cooling chamber for receiving the intermixture.

13. A cooking apparatus comprising a cooking chamber, means for introducing material to be cooked into the chamber, means for directing steam into the material to be cooked, means for compressing the steam and material into a close intermixed relationship, means for permitting controlled expansion of the intermixture, and means for varying the capacity of the chamber to vary the cooking time.

14. A continuous cooking apparatus comprising a continuous cooking chamber, means for introducing material to be cooked int the chamber, means for directing steam into the material to be cooked, means for compressing the steam and material into a close intermixed relationship, means for permitting controlled expansion of the intermixture, and a cooling chamber for receiving the intermixture.

15. A process of treating material which expands during treatment comprising intermixing a stream of treating fluid and a stream of material to be treated, compressing the treating fluid and material to be treated together into close intercontacting relationship to bring about expansion of the material, and releasing the compression gradually to compensate for the expansion but maintaining the treating fluid and material in closed intermixed relationship.

16. A process of treating material which expands during treatment comprising intermixing a stream of treating fluid and a stream of material to be treated, compressing the treating fluid and material to be treated together into close intercontacting relationship to bring about expansion of the material, and releasing the intermixture into a chamber where severe agitation and further expansion takes place still under pressure.

17. A treating apparatus comprising a treating chamber, means for intermixing material to be treated and treating material, means for compressing the material to be treated and the treating material into close intercontacting relationship to bring about expansion of the material to be treated, means to release the compression gradually and direct the materials into the treating chamber.

18. A treating apparatus comprising a treating chamber, means for intermixing material to be treated and treating material, means for compressing the material to be treated and treating material into close interconnecting relationship to bring about expansion of the material to be treated, and means to release the compression gradually and inject the mixture in interfering streams into the treating chamber.

19. A treating apparatus comprising a treating chamber, means for intermixing material to be treated and live steam, means for compressing the material to be treated and the live steam into close interconnecting relationship to bring about expansion of the material to be treated, and means to gradually release the compression and direct the mixture into the treating chamber.

20. A cooking apparatus comprising means for intermixing material to be cooked and live steam, means for compressing the material to be cooked and the live steam into close intercontacting relationship to bring about expansion of the material to be cooked, a chamber, and means for gradually releasing the compression and directing the material to be cooked and the steam into the chamber.

References Cited in the file of this patent

UNITED STATES PATENTS

| | | |
|---|---|---|
| 1,987,372 | Schellhammer | Jan. 8, 1935 |
| 2,498,209 | Iredale | Feb. 21, 1950 |
| 2,678,276 | North | May 11, 1954 |
| 2,915,023 | Rapaport | Dec. 1, 1959 |